(12) United States Patent
Handel

(10) Patent No.: US 6,236,742 B1
(45) Date of Patent: May 22, 2001

(54) COHERENT SUPERSCAN EARLY CANCER DETECTION

(76) Inventor: Peter H. Handel, 7703B Circle Dr., St. Louis, MO (US) 63121

( * ) Notice: Subject to any disclaimer, the term of this patent is extended or adjusted under 35 U.S.C. 154(b) by 0 days.

(21) Appl. No.: 09/112,602

(22) Filed: Jul. 9, 1998

Related U.S. Application Data

(60) Provisional application No. 60/052,020, filed on Jul. 9, 1997.

(51) Int. Cl.$^7$ ....................................................... G06T 5/10
(52) U.S. Cl. ............................ 382/128; 382/128; 382/130
(58) Field of Search ............................ 382/106, 128, 382/260; 600/407; 364/413; 378/8; 128/653; 350/320

(56) References Cited

U.S. PATENT DOCUMENTS

| | | | |
|---|---|---|---|
| 4,895,431 | * 1/1990 | Tsujiuchi et al. | 350/320 |
| 4,989,142 | * 1/1991 | Crawford | 364/413 |
| 5,414,623 | * 5/1995 | Lu et al. | 364/413 |
| 5,431,161 | * 7/1995 | Ryals et al. | 128/653 |
| 5,588,032 | * 12/1996 | Johnson et al. | 378/8 |
| 5,803,914 | * 9/1998 | Ryals et al. | 600/407 |
| 5,909,516 | * 6/1999 | Lubin | 382/260 |
| 5,963,658 | * 10/1999 | Klibanov et al. | 382/128 |
| 5,974,159 | * 10/1999 | Lubin et al. | 382/106 |

* cited by examiner

*Primary Examiner*—Matthew C. Bella
*Assistant Examiner*—M. Choobin
(74) *Attorney, Agent, or Firm*—Polster, Lieder, Woodruff & Lucchesi, LC

(57) ABSTRACT

An early tumor detection method based on the coherent superposition of a medical MRI or CAT scan digital images. A first digital image to be superimposed on a second digital image is translated and rotated to minimize mean quadratic error between the images. An optimal lowpass vector field is then calculated which, when applied to the translated and rotated digital image, further reduces the quadratic error between the images. Next, an optimal highpass vector field is calculated such that when it is subtracted from said lowpass vector field, and the resulting vector applied to said first digital image, both the first and second digital image are superimposed to a high degree of correlation. Finally, the divergence of the high-wave vector part of resulting reduced vector field is calculated and regions of either negative or positive divergence representative of potential malignant tumor growth are displayed for a medical specialist to view.

28 Claims, 1 Drawing Sheet

COHERENT SUPERSCAN EARLY CANCER DETECTION

This appln claims benefit of Provisional Ser. No. 60/052,020, filed Jul. 9, 1997.

BACKGROUND OF THE INVENTION

This invention relates to the early detection and discovery of malignancy or neoplazic formations in the bodies of humans and animals, and more specifically to a method for superimposing separate digital Magnetic Resonance Imaging (MRI) or Computer Aided Tomograph (CAT) scans recorded at different times to detect variations indicative of malignant growth.

In general, Magnetic Resonance Imaging (MRI), Computer Aided Tomographs (CAT), and radiographs provide medical specialists with high resolution digital images representative of the so internal structures and tissues of both human and animal patients. Such images allow for the examination of the internal structures and tissues without the need for exploratory surgery, greatly benefiting the patient. As powerful tools for detecting cancer, the MRI, CAT, and radiograph images may be visually examined by specialists trained to observe the signs of malignant or abnormal tissue growth. Such visual examination of the images is, however, restricted to locating malignancies or growths which have already obtained a minimum size sufficiently large to be observed visually. This minimum size for visual observation is significantly larger than the highest degree of resolution provided by the images, and is representative of malignancies which have been present in the patient for a significant period of time. Accordingly, patients would greatly benefit from a detection scheme capable of observing and locating malignancies and tumors at an earlier stage of growth, thereby improving the chances for a full and rapid recovery.

One possible way to detect such malignancies and tumors prior to their becoming visible to the human eye on the MRI, CAT and radiographs would be to compare current images of the patient with previous images, and observe any tissue changes. However, previously it has not been possible to provide for direct computer comparison of such images due to the problems presented by superimposing the images. To compare two digital images, a computer must be capable of superimposing one image over the other with a high degree of accuracy. If such a superposition is successful, areas within the images which have changes will be easily detectable. If the superposition is not done with a high degree of accuracy, the computer will observe that the entire image appears to have changed, and any useful information will be lost. Images produced by MRI, CAT, and radiograph scans present further complications for comparison in that the position of the patient may have changed from one image to another, the patient may have grown or shrunk, or may contain different foods within the intestinal tract. Accordingly, images taken at 1 year intervals prior to my invention will never have enough similarity to allow for existing computer comparison methods to be effective.

The coherent superscan early cancer detection method of the present invention overcomes the problems associated with the differences in patient position, size, and internal structures between images usually preventing digital image comparison, by digitally altering one of the images in such a way as to permit computer comparison and detection of malignant growth much sooner than current visual observation allows.

BRIEF SUMMARY OF THE INVENTION

The several objects and advantages of the present invention include:

The provision of a new and improved method of early cancer detection employing full-body digital images recorded through Magnetic Resonance Imaging (MRI);

The provision of new and improved method of early cancer detection employing full-body digital images recorded through Computer Aided Tomography (CAT);

The provision of a new and improved method of early cancer detection employing digital images recorded by radiography;

The provision of a new and improved method of early cancer detection which superimposes a first recorded digital image of a patient and a second, subsequently recorded and altered patient digital image, identifying malignant growths;

The provision of a new and improved method of early cancer detection which highlights potential malignancies in digitally recorded and compared images;

The provision of a new and improved method of early cancer detection which is capable of detecting malignant growths or neoplazic formations in patients prior to such growths or formations becoming visible by visual inspection of recorded images;

The provision of a new and improved method of early cancer detection which determines a vector displacement field representative of the change between images to be superimposed; and The provision of a new and improved method of early cancer detection which determines the divergence of a vector displacement field, the divergence representative of tissue displacement caused by potentially malignant growths.

Briefly stated, the new and improved method of early cancer detection of the present invention is primarily intended to facilitate the detection of malignant or neoplazic formations in the bodies of human and animal patients. First, digital images of a patient are obtained using an MRI, CAT or radiography imaging system. Typically, these images are taken over a period of several months or a year, allowing for some growth in a potential malignancy to take place. Once obtained, one image of a comparison pair is digitally translated and rotated in three dimensions until the mean quadratic error between the images is minimized in four or five dimensions, where the fourth and fifth dimensions represent the amplitude and phase (or relaxation time) information obtained for each image pixel through MRI. In the case of radiographs, only intensity information is obtained in addition to the spatial dimensions, so the error is only minimized in four dimensions.

Next, an arbitrary continuous lowpass vector field of displacements in three-dimensional space is digitally applied to the altered image, shifting each image point and further reducing the calculated quadratic error resulting from large image features. Large image features are typically produced by the different positions in which the patient is presented from one image to the next, or by slight variations in the depth or vertical position of the recorded MRI or CAT scan planes. Once the lowpass vector field resulting in minimized quadratic error is determined, an arbitrary high-pass vector field is then subtracted from the result, further minimizing the quadratic error with respect to small features of the image and providing a final vector field of displacements for the altered image. In both cases, the optimization can be done in Fourier space on the amplitude and phase of the Fourier coefficients.

By digitally determining the divergence of the resulting high-pass vector field, and by color-coding the regions of positive and negative values accordingly, areas where tissue has been displaced by new growth during the interval between the first and second image are shown and highlighted by color and flashing. These regions may then be magnified and examined by trained medical personal to determine if they are false alarms caused by ingested material or potentially malignant growths.

The foregoing and other objects, features, and advantages of the present invention as well as presently the preferred method thereof will become more apparent from the reading of the following description in connection with the accompanying drawings.

BRIEF DESCRIPTION OF THE SEVERAL VIEWS OF THE DRAWING

In the drawings.

Corresponding reference characters indicate corresponding parts throughout the several views of the drawings. The sequence 1–4 is performed for each depth of the MRI or CAT scan.

DETAILED DESCRIPTION OF THE INVENTION

The following detailed description illustrates the method of the present invention by way of example and not by way of limitation. The description will clearly enable one skilled in the art to use the invention, describes several adaptations, variations, alternatives, and uses of the invention, including what is presently believed to be the best mode of carrying out the invention. While the invention is described in particular detail with respect to the preferred embodiment of the invention, those skilled in the art will recognize the wider applicability of the inventive principles described hereinafter.

Figure 1:
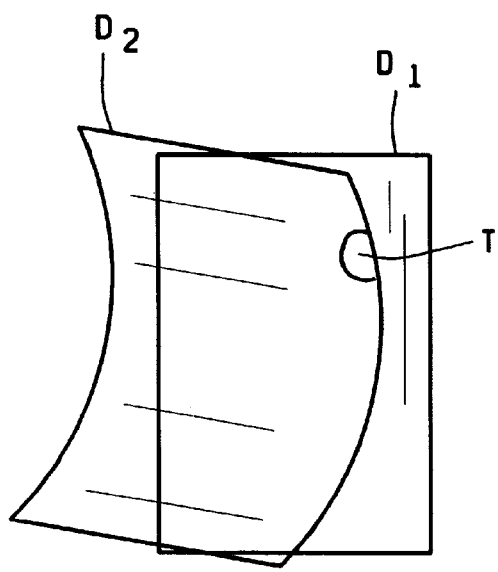
FIG. 1 is a representation of two original digital images superimposed, illustrating the lack of corresponding elements.
Figure 2:
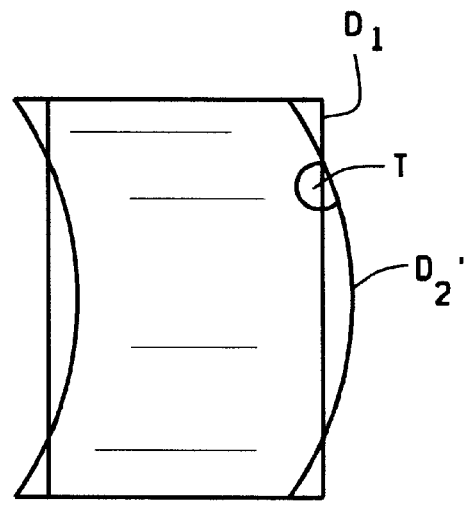
FIG. 2 is a representation of the two digital images shown in FIG. 1, after the second image has been altered by application of a translation and rotation.
Figure 3:
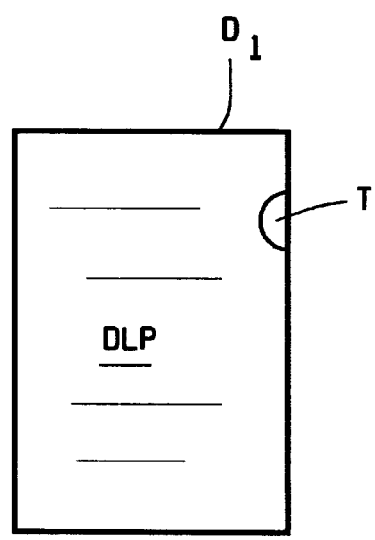
FIG. 3 is a representation of the two digital images shown in FIG. 2, and after the second image has been further altered by the application of a highpass vector field, illustrating the resulting correspondence between small image features; and a representation of the divergent vector field calculated from the superposition of the digital images shown in FIG. 3, illustrating the detection of a possible malignant growth.
Figure 4:
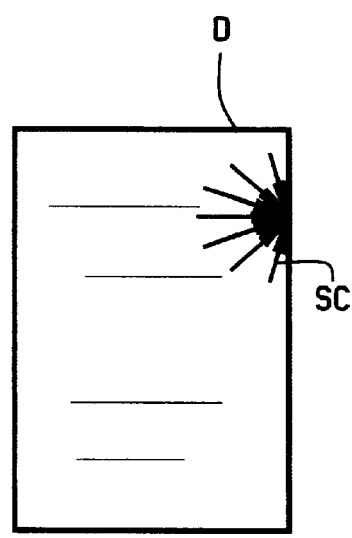
FIG. 4 is a representation of the two digital images shown in FIG. 3, and after the second image has been altered by the application of a lowpass vector field, illustrating the resulting correspondence between large image features.

Referring to the drawings, and particularly to FIG. 1, two unaltered digital images of the patient, D1 and D2 are obtained at different times using a suitable imaging system such as a Magnetic Resonance Imaging (MRI) machine, a Computer Aided Tomography (CAT) machine, or a radiography (X-ray) machine. A period of time, typically a year or more, will have elapsed between the time the first image D1 is taken (and stored in archives) and the second image D2 is taken. In general, the second image D2 will differ from the first image D1 by at least the image amplitude. The new amplitude $\xi'$ of image D2 differs from the first image D1 amplitude $\xi$ for every point r(x,y,z), where r(x,y,z) represents every point or pixel in the three dimensional digital image space. The coordinate z takes only the discret values of the MRI or CAT scan plane depths used in the two recordings. To begin the superposition of the two images, the squared difference between the image amplitudes, calculated in every point in the image space r(x,y,z) and summed over the 3-dimensional array of points or pixels r, gives a measure of the error E $$E = \sum_r (\xi'_r - \xi_r)^2$$

Next, a new position vector r'(x',y',z') is assigned to every point or pixel in the image D2 to be superimposed on image D1.

$$r'(x',y',z')=r(x,y,z)+v(a,b,c), \xi_r''=\xi_r+\gamma$$

where the vector v of components a, b and c represents a translation of the whole image and $\gamma>0$ corresponds to a general darkening and $\gamma<0$ to a generally lighter image. Values are then calculated for a=A, b=B, c=C and $\gamma=\Gamma$ which minimize the error E. These values may either be calculated directly, or from the equations:

$$\partial E/\partial v=0; \partial^2 E/\partial v^2>0;$$

$$\sum_r (\xi'_r - \xi_r) = 0$$

This translation of the digital image D2 by the optimal vector V(A,B,C) resulting in minimal error, produces a translated image D2' which is optimally translated over the first digital image D1 obtained from the first scan of the patient and stored in archives.

Next, to complete the initial superposition of the digital images D1 and D2, the translated image D2' calculated from D1 is rotated by an angle $\theta$ around a vertical axis perpendicular to the MRI or CAT scan planes, for example (where those devices are employed to obtain the desired images), to further minimize displacement error:

$$r''(x'',y'',z'')=(x' \cos \theta - y' \sin \theta)i+(x' \sin \theta + y' \cos \theta)j+kz'$$

The optimal angle $\Theta$ for which the displacement error between the two images D2' and D1 is minimized is then calculated either directly, or from the equations:

$$\partial E/\partial \theta=0; \partial^2 E/\partial \theta^2>0$$

This rotation by the optimal angle $\Theta$ produces a displaced digital image D2" derived from the digital image D2 which is optimally translated and rotated over the first digital image D1, previously obtained from the archives.

In reality, the two digital images D1 and D2 may also differ from each other because the patient has an arbitrary slight bend or muscular contraction in his new position during the second digital image scan, because he grew (even as an adult) or shrunk during the time interval between the image scans, because of localized benign or malignant tumoral growth T, or because of the presence of a small rotation along the x or y image axes. To compensate for these differences, an arbitrary small continuous lowpass vector field of displacements $\rho(x'',y'',z'')=\alpha i+\beta j+\gamma k$ in 3-dimensional space is applied to the optimally translated and rotated digital image D2"

$$r'''=r''+\alpha(x'',y'',z'')i+\beta(x'',y'',z'')j+\gamma(x'',y'',z'')k$$

The application of this small lowpass vector field ρ(x",y",z") slightly shifts the image points of the digital image D2" at every point, thereby modifying the quadratic error resulting from a comparison with the first digital image D1. The small lowpass vector field ρ(x",y",z") is generated by calculating the fourier-expansion:

$$\rho(x'', y'', z'') = \sum_{|\kappa|<K} \sigma(\kappa)e^{i\kappa r}; \quad \sigma^*(\kappa) = \sigma(-\kappa)$$

which is limited to a few small wave-vectors κ, because K is about 2π, times a reciprocal inch or 0.4 cm$^{-1}$. The resulting image, DLP can now be superimposed almost perfectly on the original digital image D1. Small scale differences between the two digital images, DLP and D1 remain, and can not be compensated for by the application of the small lowpass vector field because it is limited to small wave-vectors. These small scale differences contain the T information which is representative of changes between the digital images caused by potentially malignant growths or tumors.

At this stage an arbitrary small continuous highpass vector field of displacements $\rho_f(x''',y''',z''')=\alpha_f i+\beta_f j+\gamma_f k$ in 3-dimensional space is applied to the digital image DLP:

$$r_f = r''' + \alpha_f(x''',y''',z''')i + \beta_f(x''',y''',z''')j + \gamma_f(x''',y''',z''')k$$

slightly shifting the image points of the digital images DLP, thereby completely reducing the quadratic error E of comparison with digital image D1 to zero, i.e., to the system noise level. The small highpass vector field $\rho_f(x''',y''',z''')$ is generated by calculating the fourier-expansion:

$$\rho_f(x''', y''', z''') = \sum_{|\kappa|>K} \sigma(\kappa)e^{i\kappa r}; \quad \sigma^*(\kappa) = \sigma(-\kappa)$$

which is limited to a few large wave-vectors κ. This vector field will superpose the two three-dimensional digital images D1 and DLP (derived from D2) perfectly, except for small noise differences. The T information representative of potentially malignant growths is now contained in the final vector field $\rho_f(x''',y''',z''')$, referred to as the coherent superscan vector field SC, and limited to large wave-vectors.

The final step in locating and displaying the T information is to calculate the divergence of the coherent superscan vector field SC:

$$\nabla \rho_f(x''',y''',z''') = \partial\alpha/\partial x''' + \partial\beta/\partial y''' + \partial\gamma/\partial z'''$$

Once calculated, the divergence of the coherent superscan vector field SC is displayed such that areas of negative divergence are highly visible to the system operator, typically by displaying them on a display screen in a flashing red color. These areas of negative divergence calculated from the processing of the second digital image D2 are representative of areas where tissue has been displaced from the previous digital image D1, indicating the presence of small tumors or other malignant growths. Presenting the divergence information in superposition with the original digital image D1 allows a medical specialist to quickly determine which areas of the patient's body must be more closely examined to eliminate non-malignant growths. For ideal detection and superposition of MRI/CAT scan images, patients would be required to purge their gastrointestinal tracts prior to each scan, much the same as is done before a colonoscopy. This will reduce the number of false signals caused by the presence of food in the intestinal tract during the imaging operation.

Ideally, the above described operations on the digital images are performed on a computer, and the resulting divergence field both displayed graphically and stored for future reference. It should also be noted that the above described image transformations may be done on the first digital image D1, rather than the second digital image D2. In such situations, the resulting divergence field will have opposite values from that calculated from D2. To compensate, the areas of positive divergence, representative of potential malignancies, will be highlighted and displayed for the medical specialist, rather than the areas of negative divergence.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense. For example, other devices for obtaining the images for comparison may be used, as the particular devices are not central to the invention itself. While the invention was described with respect to medical applications, the invention may be applied to other uses, for example in comparing consecutive images obtained from spy satellites, mapping flights, failure detection in machine or construction parts, and other similar uses. These variations are merely illustrations.

What is claimed is:

1. A method for detection of image variations based on the coherent superposition of first and second digitized images, comprising:

digitally translating and rotating said second digital image in three dimensions until a mean quadratic error between said first and second digitized images is minimized in at least two dimensions;

determining an optimal continuous lowpass vector field of three-dimensional displacements, such that applying said lowpass vector field to said translated and rotated digital image further minimizes said mean quadratic error between said first digitized image and said translated and rotated digital image in each of the imaged planes;

determining an optimal continuous highpass vector field of three-dimensional displacements, such that improving said lowpass vector field by said highpass vector field further minimizes said mean quadratic error between said first digitized image and said translated and rotated digital image;

calculating a divergence of said optimal continuous highpass vector field, regions of divergence of said optimal highpass vector field being representative of potential image variation; and displaying said regions of divergence superimposed on said first digital image.

2. The method of claim 1 wherein said dimensions include two spatial dimensions and one amplitude dimension.

3. The method of claim 2 wherein said first and second digitized images are obtained through magnetic resonance imaging.

4. The method of claim 3 wherein said mean quadratic error is minimized in five dimensions, the fifth dimension containing phase information.

5. The method of claim 2 wherein said first and second digitized images are obtained through computer aided tomography scanning.

6. The method of claim 2 wherein said first and second digitized images are obtained through radiographic imaging.

7. The method of claim 1 wherein said optimal continuous lowpass vector field is determined by optimization of the fourier-expansion coefficients σ(κ) in $$\rho(x'', y'', z'') = \sum_{|\kappa|<K} \sigma(\kappa)e^{i\kappa r}$$

resulting in components with wave vectors below magnitude K.

8. The method of claim 7 wherein K has a magnitude near $\pi$ cm$^{-1}$.

9. The method of claim 1 wherein said optimal continuous highpass vector field is determined by optimization of the fourier-expansion coefficients in $$\rho_f(x''', y''', z''') = \sum_{|\kappa|>K} \sigma(\kappa)e^{i\kappa r}$$

resulting in components with wave vectors greater than magnitude K.

10. The method of claim 1 wherein said steps of translating, rotating, determining, calculating, and displaying are performed by a computer.

11. The method of claim 1 wherein said images are medical images, said regions of divergence having negative values are representative of potential tumor growth when said second digital image is newer than said first digital image.

12. The method of claim 1 wherein said images are medical images, said regions of divergence having positive values are representative of potential tumor growth when said first digital image is newer than said second digital image.

13. The method of claim 1 wherein said regions of divergence are displayed in flashing red color superimposed on said first digital image.

14. A method for detection of image variations based on the coherent superposition of first and second digitized images, comprising:
   translating and rotating the first digitized image such that the mean quadratic error of comparison between said first and second digitized images is minimized;
   calculating a multi-dimensional vector field such that the application of said vector field to said translated and rotated first digitized image further reduces said mean quadratic error;
   determining the divergence of said multi-dimensional vector field in the high wave-vector region, regions of said divergence being representative of potential image variation; and
   displaying said divergence superimposed on said second digitized medical image.

15. The method of claim 14 wherein calculating said multi-dimensional vector comprises:
   determining an optimal continuous lowpass vector field in three-dimensions, said lowpass vector field slightly deforming said translated and rotated first digitized image to coherently superimpose on said second digitized image with reduced quadratic error; and
   determining an optimal continuous highpass vector field in three-dimensions, modifying said lowpass vector field by said highpass vector field, yielding said multi-dimensional vector field and further reducing quadratic error.

16. The method of claim 14 wherein said optimal continuous lowpass vector field is calculated from the fourier-expansion $$\rho(x'', y'', z'') = \sum_{|\kappa|<K} \sigma(\kappa)e^{i\kappa r}$$

which is limited to small wave-vectors with magnitude less than K.

17. The method of claim 16 wherein said optimal continuous highpass vector field is calculated from the fourier-expansion $$\rho_f(x''', y''', z''') = \sum_{|\kappa|>K} \sigma(\kappa)e^{i\kappa r}$$

which is limited to wave-vectors with magnitude greater than K.

18. The method of claim 15 wherein said images are medical images and said regions of divergence are representative of potentially malignant tumor growth, are dependent upon which of said first and second digitized medical images is older.

19. The method of claim 18 wherein said regions of divergence having positive values are representative of potentially malignant tumor growth when said first digitized medical image is older than said second digitized medical image.

20. The method of claim 19 wherein said regions of divergence having negative values are representative of potentially malignant tumor growth when said second digitized medical image is older than said first digitized medical image.

21. The method of claim 15 wherein said mean quadratic error is minimized in three spatial dimensions and one amplitude dimension.

22. The method of claim 14 wherein said first and second digitized medical images are magnetic resonance images.

23. The method of claim 21 wherein said mean quadratic error is additionally minimized in a phase dimension.

24. The method of claim 14 wherein said first and second digitized medical images are computer-aided tomograph images.

25. The method of claim 14 wherein said first and second digitized images are radiograph images.

26. The method of claim 15 wherein said images and medical images and displaying said divergence further includes highlighting the regions of said divergence, said divergence being representative of potentially malignant tumor growth, in a flashing red color.

27. The method of claim 15 wherein translating and rotating said first digitized image compensates for large image features produced by altered imaging positions.

28. The method of claim 15 wherein said multi-dimensional vector field compensates for small image features produced by contraction and expansion of image elements.

* * * * *